Aug. 18, 1964  C. M. FOOTE ETAL  3,144,919
PUSH-PULL SHAFT ASSEMBLY
Filed July 24, 1962

INVENTORS
CHARLES M. FOOTE
CLEM W. EVARD
EMIL A. GORDON
BY
RICHEY, McNENNY & FARRINGTON
William J. Flynn
ATTORNEYS United States Patent Office 3,144,919
Patented Aug. 18, 1964

3,144,919
PUSH-PULL SHAFT ASSEMBLY
Charles M. Foote, Cleveland Heights, Ohio, and Clem W. Evard, Columbia City, and Emil A. Gordon, Churusko, Ind., assignors to The Weatherhead Company, Cleveland, Ohio, a corporation of Ohio
Filed July 24, 1962, Ser. No. 212,007
5 Claims. (Cl. 188—67)

This invention relates to a push-pull shaft assembly.

Various arrangements have been proposed heretofore in which a shaft may be deliberately adjusted lengthwise and is held frictionally in the position to which it has been adjusted. For example, such arrangements may be provided for shafts connected to manual control knobs on the dashboard of an automobile. One of the disadvantages of previous arrangements of this general type is that the static, break-away friction (i.e., the friction which must be overcome to start the shaft moving) is substantially greater than its dynamic moving friction (i.e., the friction which must be overcome to keep the shaft moving, once it has started). Also, the moving friction sometimes varies substantially over the range of the shaft's movement. These factors have made it difficult for the user to move the shaft or cable smoothly and precisely to the desired position.

The present invention is directed to a novel arrangement which substantially avoids these disadvantages. In accordance with the present invention a novel push-pull shaft assembly is provided in which the static break-away friction on the shaft is only slightly greater than the dynmic moving friction, and in which the moving friction remains substantially constant throughout the continued movement of the shaft, thereby enabling the user to exert a more precisely controlled effort on the shaft.

Accordingly, it is an object of this invention to provide a novel and improved push-pull shaft assembly.

Another object of this invention is to provide such a shaft assembly in which the dynamic friction remains substantially constant throughout the shaft's movement.

Another object of this invention is to provide such a novel and improved shaft assembly in which the static break-away frictional restraint on the shaft is not excessively greater than its dynamic friction.

Another object of this invention is to provide such an assembly which is adapted for mass production economically.

Further objects and advantages of this invention will be apparent from the following detailed description of a presently-preferred embodiment thereof, which is illustrated in the accompanying drawing.

Figure 1:
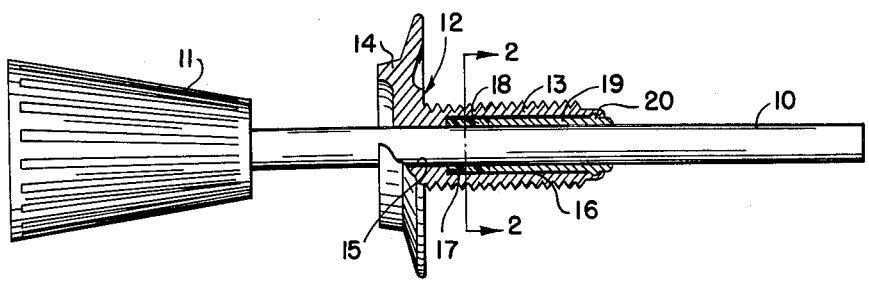
FIGURE 1 is a view, partly in elevation and partly in longitudinal section, showing a push-pull shaft assembly in accordance with the present invention.

Referring to FIG. 1, the shaft assembly shown therein comprises an elongated, straight shaft 10 of metal or other suitable rigid material, having a cylindrical periphery and carrying a manually engageable control knob 11 at its outer end. The shaft extends through a housing or support member 12 of metal or other suitable rigid material, having an elongated screw-threaded shank 13 enabling it to be mounted on a panel (not shown) such as the dashboard of an automobile, and a flanged transverse front head 14 adapted to extend in front of the panel.

At its head end and extending a short distance into its shank, the support 12 presents a cylindrical bore 15 which loosely receives the shaft 10 and exerts substantially no frictional restraint thereon. An enlarged cylindrical counterbore 16 extends from the inner end of the bore 15 throughout the remainder of the shank 13 on the support 12. An annular transverse internal shoulder 17 is formed on the support at the juncture between its bore 15 and its counterbore 16.

A friction bushing 18, described in detail hereinafter, is seated in the counterbore 16 engaging the internal shoulder 17.

An elongated retainer sleeve 19 of metal or other suitable rigid material is received in the counterbore 16, engaging the opposite end of the friction bushing 18. Near its inner end the retainer sleeve 19 is formed with an external rounded rib 20. The inner end of the shank 13 on the support 12 is crimped over this rib to retain the retainer sleeve 19 and the friction bushing 18 in place in the counterbore 16 with substantially no axial play and without compressing the bushing 18 endwise. The retainer sleeve 19 throughout its length receives the shaft 10 loosely and exerts substantially no frictional restraint thereon.

Figure 2:
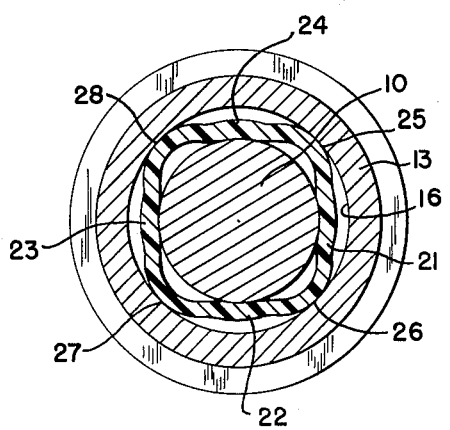
FIGURE 2 is an enlarged cross-section taken along the line 2—2 in FIG. 1.
Figure 3:
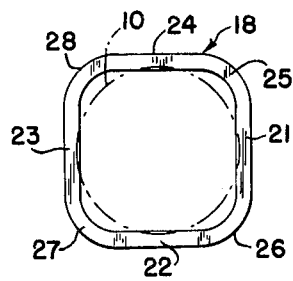
FIGURE 3 is an enlarged end elevational view showing the plastic friction bushing in the present assembly, with the associated shaft shown in phantom.
Figure 4:
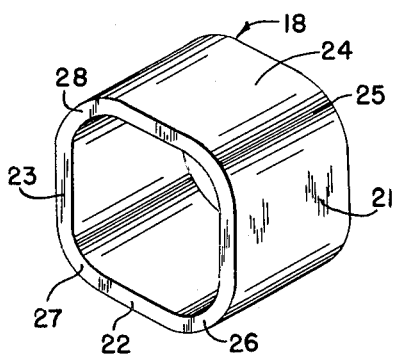
FIGURE 4 is an enlarged perspective view of this friction bushing.

Referring to FIGS. 2–4, the friction bushing 18 when unstressed, is of generally square cross-section, presenting four equal straight sides 21–24 and four rounded corners 25–28 integrally joining adjacent sides. As shown in FIG. 2, the rounded corners 25–28 have a snug fit against the cylindrical wall of the counterbore 16. Away from these corners the sides of the friction bushing are spaced from the wall of counterbore 16.

Preferably, the friction bushing 18 is made of a thermoplastic acetal polymer resin derived from formaldehyde, sold under the name "Delrin" by E. I. du Pont de Nemours and Co. of Wilmington, Delaware, and having properties of high strength, stiffness, toughness and resiliency over a wide temperature range, good dimensional stability, and good bearing or self-lubricating characteristics.

The "across the flats" internal diameter of the friction bushing 18 (i.e., the inside diameter from the mid-point of one straight side to the mid-point of the opposite side) is slightly less than the diameter of the shaft 10, whereas its "across the corners" internal diameter is substantially greater than the shaft diameter, both as shown clearly in FIG. 3. Because of this, when the shaft 10 is received in the friction bushing 18 it causes the bushing to be stressed and deformed somewhat, as shown in FIG. 2, at the middle of each of its sides 21, 22, 23 and 24. This condition is shown somewhat exaggerated in FIG. 2 to emphasize the action which takes place. The bushing 18 is free to deform at these locations without being compressed there against the wall of counterbore 16 because the deformation takes place at locations on the sides of the bushing which have a maximum spacing from the counterbore wall. The frictional restraint which the bushing 18 exerts on shaft 10 is due to the stress and distortion of the normally flat sides of the bushing. The bushing is not compressed radially against the wall of the counterbore by the shaft. At its rounded corners 25–28, where it bears against the counterbore wall, the bushing 18 is spaced outward from the shaft 10.

It has been found that with this shaft assembly the static break-away friction on the shaft when the latter is pushed or pulled longitudinally from a stationary position is only about 1.5 pounds higher than its dynamic moving friction. Also, the dynamic frictional restraint on the shaft remains substantially constant during its movement. This is highly advantageous for the smooth and precise manual positioning of the shaft at the desired position lengthwise with respect to the housing 12. Also, the bushing 18 prevents shaft 10 from rattling against the housing 12 or the retaining sleeve 19 because of the self-centering forces imposed on the shaft by the deformation of the opposite sides of the bushing.

The frictional restraint depends upon the diameter of the shaft 10 with respect to the across-the-flats internal diameter of the bushing 18, as well as upon the radial thickness of the bushing and its axial length. In the particular embodiment illustrated, the axial length of the bushing is slightly less than its across-the-flats internal diameter.

While a presently-preferred embodiment of the invention has been described in detail herein and illustrated in the accompanying drawing, it is to be understood that various modifications which depart from the disclosed embodiment may be adopted without departing from the spirit and scope of this invention. For example, the shaft may have a periphery which is not continuously circular, such as by having a flat formed theron.

What is claimed is:

1. An assembly comprising a support having an opening therethrough, a unitary circumferentially continuous resilient deformable plastic bushing seated in said opening, said bushing having a plurality of circumferentially spaced corners engaging the side wall of said opening and between said corners presenting sides which are spaced inward from the side wall of said opening, means on said housing retaining said bushing against longitudinal movement in said opening, and a longitudinally reciprocable shaft extending through said opening and said bushing, said shaft having a maximum cross-sectional dimension greater than the minimum internal cross-sectional dimension of said bushing between said sides, said shaft engaging said sides of the bushing and deforming the latter outwardly at a plurality of circumferentially spaced locations which are spaced from said corners of the bushing, said bushing by its deformation at said sides producing a frictional restraint on the shaft at said last-mentioned locations.

2. An assembly comprising a support having an opening therethrough, a unitary circumferentially continuous one-piece resilient deformable bushing of self-lubricating plastic material seated in said opening, said bushing having a plurality of circumferentially spaced rounded corners snugly engaging the side wall of said opening and between said corners presenting normally straight opposite sides, means on said housing retaining said bushing against longitudinal movement in said opening, and a longitudinally reciprocable shaft extending through said opening and through said bushing, said shaft having a diameter slightly greater than the minimum internal diameter of said bushing between said opposite sides thereof, said shaft engaging said opposite sides of the bushing at locations spaced from said corners and deforming said sides outwardly to provide a frictional restraint thereat between the bushing and the shaft, said sides of the bushing at said last-mentioned shaft-engaging locations being spaced inward from the side wall of said opening, said rounded corners on the bushing being spaced outward from the shaft.

3. A push pull control assembly comprising a housing having a longitudinal bore therethrough, a rod mounted in said longitudinal bore and a bushing in said longitudinal bore adapted to frictionally grip said rod and to retain it in an adjusted position with respect to said housing, means retaining said bushing within said housing against longitudinal movement, said bushing being a unitary circumferentially continuous tubular member of resilient material, said bushing having a substantially uniform wall thickness and a cross-sectional shape of a regular polygon having rounded corners and normally flattened wall portions interconnecting said corners, said bushing having a circumscribed circle substantially equal to the housing bore and an inscribed circle less than the diameter of said rod whereby when said rod is within said bushing the flat wall portions of said bushing intermediate the rounded corners are expanded slightly outward in resilient fashion to provide a frictional grip on the surface of said rod.

4. An assembly as set forth in claim 3 wherein said bushing is made of acetal resin.

5. A push pull control assembly comprising an elongated housing having a first longitudinal bore therethrough at one end, said housing having an enlarged counterbore extending from the inner end of said first bore to the other end of said housing, a rod of uniform diameter mounted in said housing and having an outer diameter slightly less than the diameter of said first bore, a bushing in said counterbore adjacent said first bore adapted to frictionally grip and retain said rod in an adjusted position with respect to said housing, a tubular retainer sleeve in said counterbore outward of said bushing to retain said bushing in said housing against longitudinal movement, means retaining said tubular sleeve within said counterbore, said bushing being a unitary circumferentially continuous tubular member of resilient plastic material, said bushing having a substantially uniform wall thickness and cross-sectional shape of a regular polygon having rounded corners and normally flattened wall portions interconnecting said corners, said bushing having a circumscribed circle at least as great as the diameter of said counterbore and an inscribed circle less than the diameter of said rod whereby when said rod is within said bushing the flat wall portions of said bushing intermediate the rounded corners are expanded slightly outward in resilient fashion to provide a frictional grip on the surface of said rod.

References Cited in the file of this patent

UNITED STATES PATENTS

| 1,483,903 | Masury | Feb. 19, 1924 |
| 2,170,718 | Humphries | Aug. 22, 1939 |
| 2,215,523 | Haushalter | Sept. 24, 1940 |
| 2,699,230 | Pfalzgraff et al. | Jan. 11, 1955 |
| 2,769,352 | Elliott | Nov. 6, 1956 |
| 2,807,173 | Klaas | Sept. 24, 1957 |
| 3,096,128 | Wight | July 2, 1963 |

FOREIGN PATENTS

| 318,267 | Switzerland | Feb. 15, 1957 |